United States Patent [19]
Chen

[11] Patent Number: 5,802,930
[45] Date of Patent: Sep. 8, 1998

[54] BICYCLE PEDAL ASSEMBLY HAVING A ROTATABLE CLEAT ENGAGING UNIT MOUNTED THEREON

[75] Inventor: Chung-I Chen, Taichung Hsien, Taiwan

[73] Assignee: Teleflex Incorporated, Plymouth Meeting

[21] Appl. No.: 841,880

[22] Filed: May 5, 1997

Related U.S. Application Data

[63] Continuation-in-part of Ser. No. 837,243, Apr. 10, 1997.

[51] Int. Cl.$^6$ ............................... B62M 3/08; G05G 1/14
[52] U.S. Cl. ........................................ 74/594.6; 74/594.4
[58] Field of Search ............................... 74/594.4, 594.6, 74/560; 36/131, 132, 134

[56] References Cited

U.S. PATENT DOCUMENTS

| | | | |
|---|---|---|---|
| 5,203,229 | 4/1993 | Chen | 74/594.6 |
| 5,259,270 | 11/1993 | Lin | 74/594.6 |
| 5,419,218 | 5/1995 | Romano | 74/594.6 |
| 5,685,202 | 11/1997 | Chen | 74/594.4 X |
| 5,692,415 | 12/1997 | Lin | 74/594.6 |
| 5,697,262 | 12/1997 | Chen | 74/594.6 |

FOREIGN PATENT DOCUMENTS

| | | | |
|---|---|---|---|
| 0 619 219 A1 | 10/1994 | European Pat. Off. | 74/594.6 |
| 0 753 454 A1 | 1/1997 | European Pat. Off. | 74/594.6 |

*Primary Examiner*—Vinh T. Luong
*Attorney, Agent, or Firm*—Howard & Howard

[57] ABSTRACT

A bicycle pedal assembly includes a pedal body, a pedal shaft, a retaining member, a disc member, a torsional spring member and a pedal shaft. The pedal body has a frame portion and a tubular portion which partitions the frame portion. A cleat engaging unit is connected to the tubular portion. The retaining member is connected non-rotatably to an end of the tubular portion. The disc member has a plurality of projections which engage correspondingly a plurality of cavities that are formed in the frame portion. The torsional spring member interconnects the retaining member and the disc member in order to position revertably the cleat engaging unit at a predetermined angle with respect to the frame portion. The torsional force of the torsional spring member can be adjusted by disengaging the projections on the disc member from the cavities of the frame portion, rotating the disc member by an angle, and engaging the projections and the cavities.

4 Claims, 5 Drawing Sheets

BICYCLE PEDAL ASSEMBLY HAVING A ROTATABLE CLEAT ENGAGING UNIT MOUNTED THEREON

CROSS-REFERENCE OF RELATED APPLICATION

This is a continuation-in-part (CIP) application of co-pending U.S. patent application Ser. No. 08/837,243 filed on Apr. 10, 1997.

BACKGROUND OF THE INVENTION

1. Field of the Invention

This invention relates to a bicycle pedal assembly, more particularly to a bicycle pedal assembly which has a rotatable cleat engaging unit mounted thereon.

2. Description of the Related Art

Figure 1:
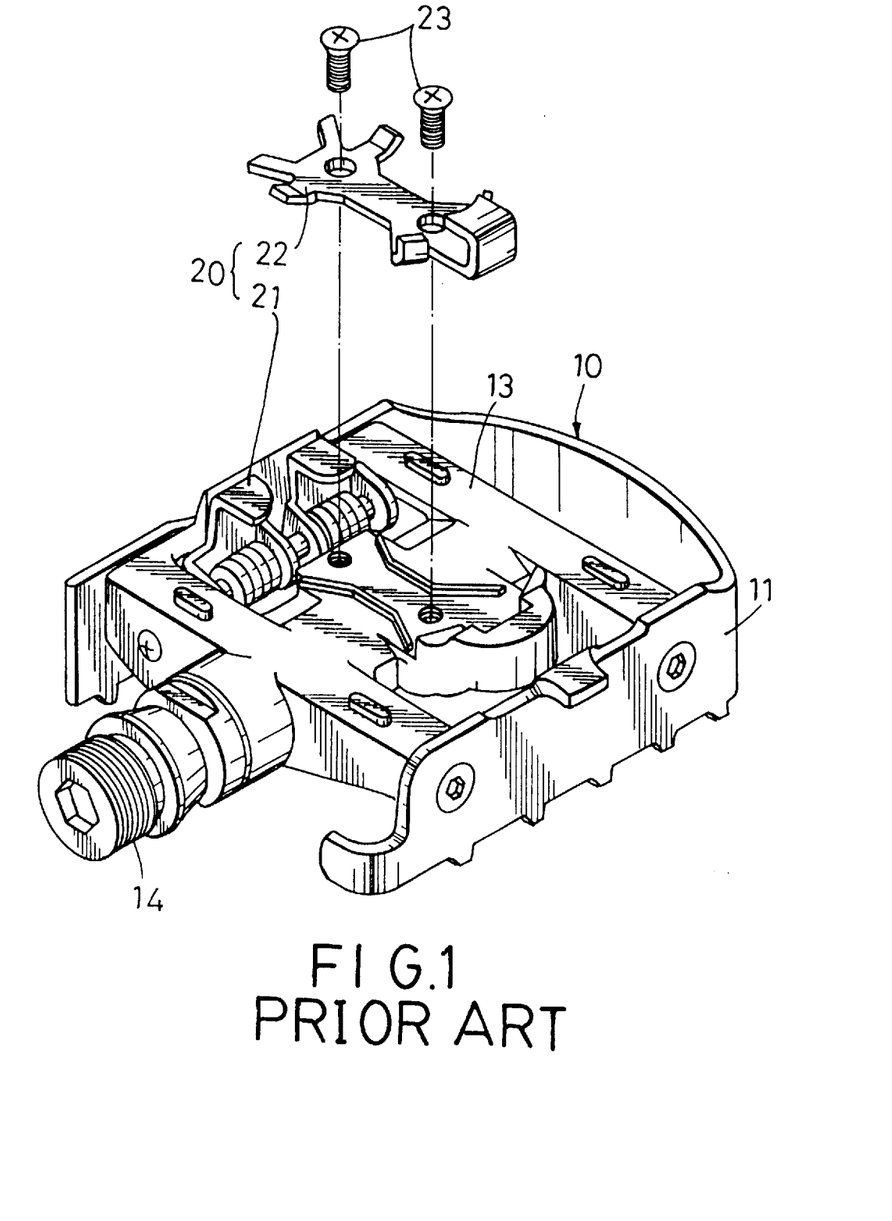
FIG. 1 is an exploded view of a conventional bicycle pedal assembly.
Figure 2:
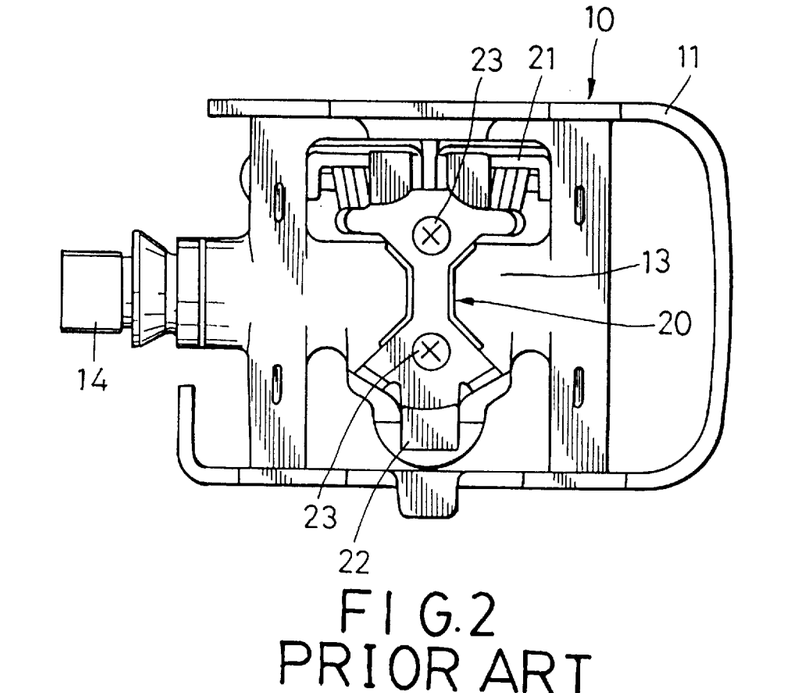
FIG. 2 is a top view of the conventional bicycle pedal assembly.

Referring to FIG. 1, a conventional bicycle pedal assembly is shown to comprise a pedal body 10 and a pedal shaft 14. The pedal body 10 includes a generally rectangular frame portion 11 and a tubular portion 13 which divides the frame portion 11 in a transverse direction, as best illustrated in FIG. 2. The tubular portion 13 has a cleat engaging unit 20 fixed thereon in order to engage a cycling shoe, thereby preventing untimely disengagement of the pedal assembly and the cycling shoe. The cleat engaging unit 20 has a lower engaging member 21 which is fixed transversely to the tubular portion 13, and an upper engaging member 22 which is connected to the lower engaging member 21 by means of screw members 23. The pedal shaft 14 is journalled in the tubular portion 13 of the pedal body 10, and has an end connected to a crank arm (not shown) of a bicycle.

Since the cleat engaging unit 20 is fixed to the tubular portion 13 at a fixed angle relative to the frame portion 11, the cycling shoe is not allowed to swivel relative to the frame portion 11 during the pedal stroke. This is a shortcoming in case of long distance riding.

SUMMARY OF THE INVENTION

The object of the present invention is to provide a bicycle pedal assembly which can overcome the shortcoming that is commonly associated with the conventional bicycle pedal assembly.

According to the present invention, the bicycle pedal assembly comprises:

a pedal body including a frame portion and a tubular portion with first and second ends which partitions the frame portion in a transverse direction, the frame portion having first and second through holes which are aligned with one another in the transverse direction, and a plurality of engaging cavities formed adjacent to the second through hole of the frame portion, the tubular portion having a cleat engaging unit fixed thereto, the second end of the tubular portion having a plug member with an axial blind hole engaging threadedly therein;

a pedal shaft extending rotatably through the tubular portion and having a first threaded end which extends through the first through hole of the frame portion, a second threaded end which extends into the axial blind hole of the cap member, a nut member which engages the second threaded end, and a bearing which is mounted near the second threaded end of the pedal shaft;

a tubular retaining member having a closed end and an open end, the closed end of the retaining member extending into the second end of the tubular portion adjacent to the plug member and having a first engaging hole formed therein, the open end of the retaining member being connected non-rotatably to the second end of the tubular portion;

a torsional spring member having first and second ends and being disposed in the retaining member, the first end of the torsional spring member engaging the first engaging hole of the retaining member; and a disc member received in the second through hole of the frame portion and having opposed first and second side faces, the first side face of the disc member having a second engaging hole formed therein, the second side face of the disc member having a plurality of projections formed thereon, the torsional spring member biasing the disc member so that the projections on the disc member engage correspondingly the cavities of the frame portion, the second end of the torsional spring member engaging the second engaging hole of the disc member so that the cleat engaging unit is positioned revertably at a predetermined angle with respect to the frame portion of the pedal body.

A torsional force of the torsional spring member can be adjusted by means of pushing the disc member toward the retaining member against the biasing force of the torsional spring member in order to disengage the projections of the disc member from the cavities of the frame portion, rotating the disc member, and releasing the disc member in order engage the projections and the cavities.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 3:
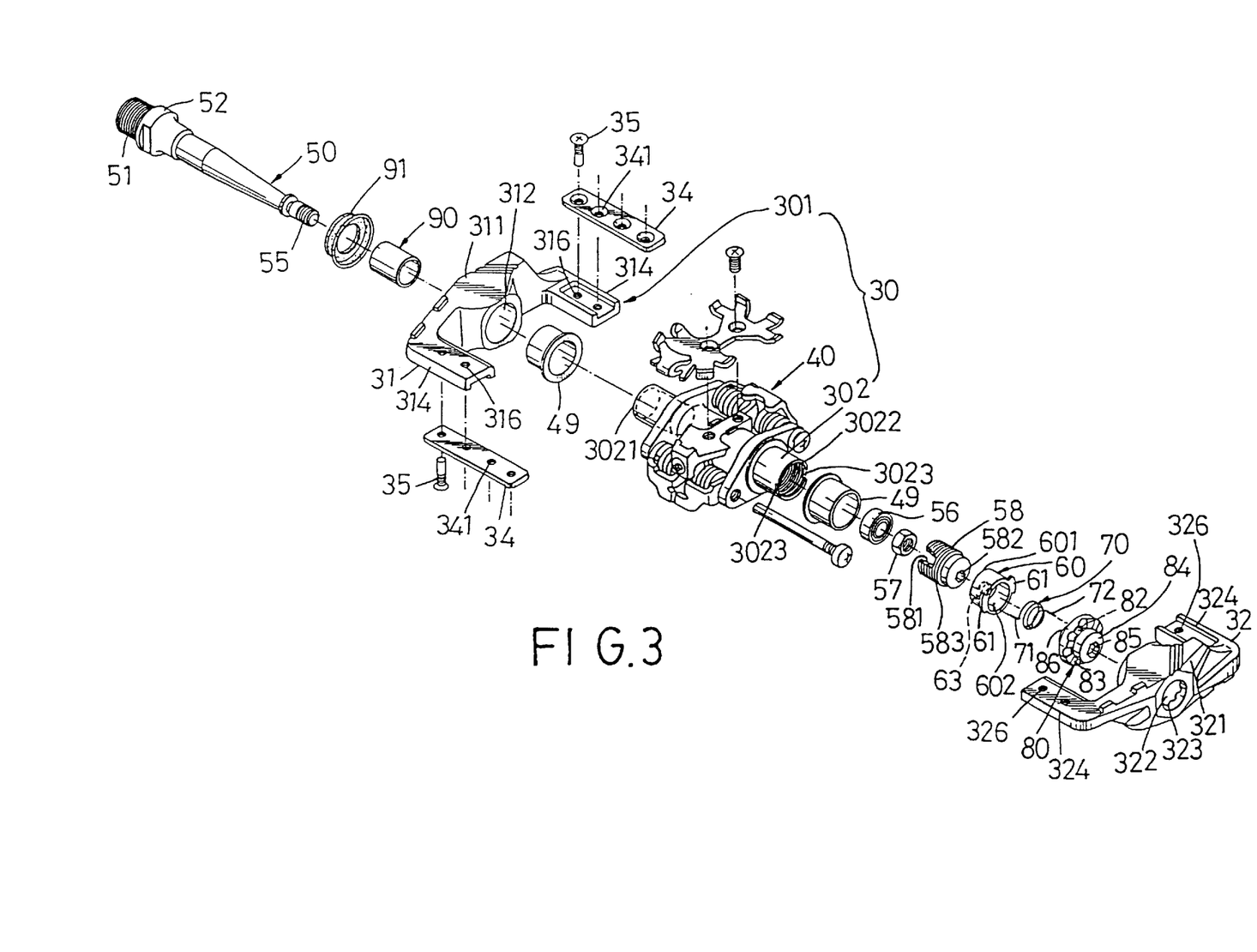
FIG. 3 is an exploded view of a preferred embodiment of a bicycle pedal assembly according to the present invention.
Figure 4:
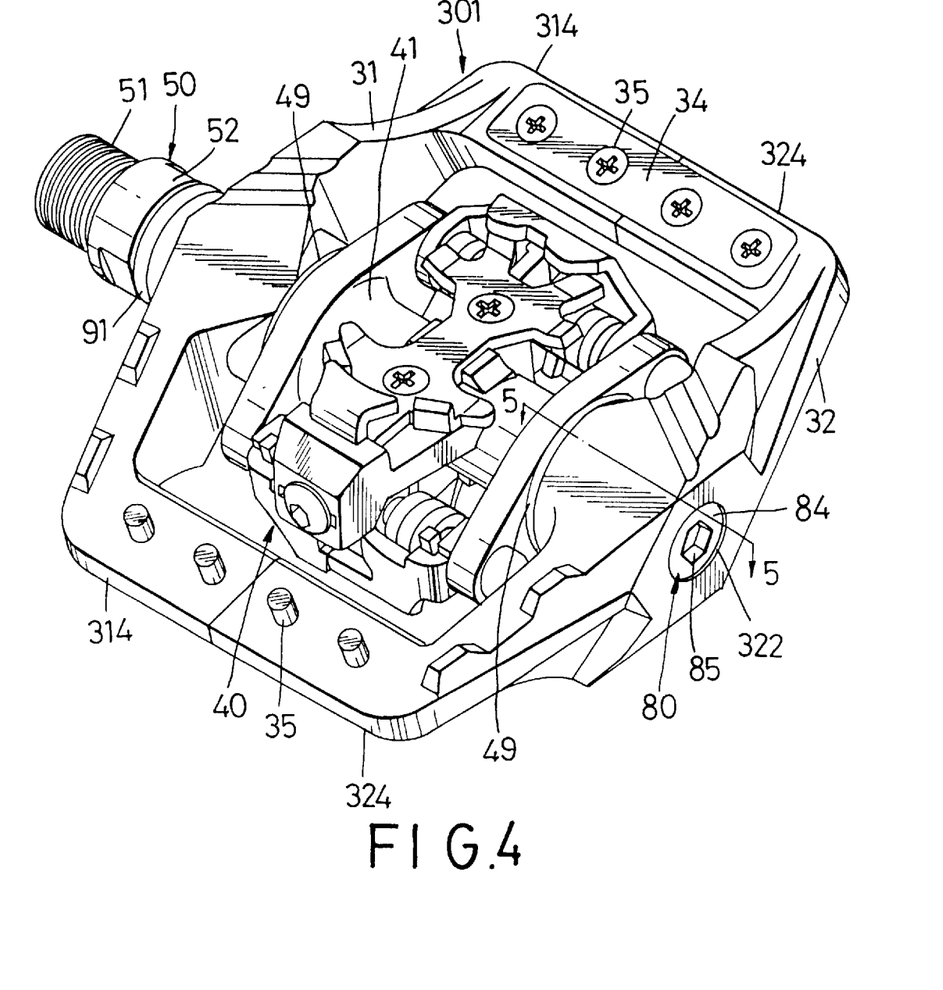
FIG. 4 is a perspective view of the preferred embodiment of the bicycle pedal assembly according to the present invention.

Referring to FIGS. 3 and 4, a preferred embodiment of a bicycle pedal assembly according to the present invention is shown to comprise a pedal body 30, a cleat engaging unit 40, a pedal shaft 50, a tubular retaining member 60, a torsional spring member 70 and a disc member 80.

The pedal body 30 includes a frame portion 301 and a tubular portion 302 with first and second ends 3021, 3022 which partitions the frame portion 301 in a transverse direction. The frame portion 301 is generally rectangular and has first and second U-shaped members 31, 32 and a pair of connecting plates 34. Each of the first and second U-shaped members 31, 32 has two arm portions 314, 324. Each of the arm portions 314, 324 of the first and second U-shaped members 31, 32 has a plurality of threaded holes 316, 326 formed therein. Each of the connecting plates 34 interconnects detachably the respective one of the arm portions 314, 324 of the first and second U-shaped members 31, 32 by engaging screw members 35 and threaded holes 341 formed in the connecting plates 34 and the corresponding threaded holes 316, 326 of the first and second U-shaped members 31, 32, as best illustrated in FIGS. 3 and 4. As such, the first and second U-shaped members 31, 32 are connected to one another in order to form a rectangular frame structure.

The cleat engaging unit 40 is fixed to the tubular portion 302 in a manner similar to that in the aforementioned prior art. Since the structure of the cleat engaging member 40 is similar to that of the cleat engaging unit 20 in the prior art, and since the feature of the present invention does not reside in said structure, the cleat engaging unit 40 will not be detailed hereinbelow for the sake of brevity.

Each of the first and second U-shaped members 31, 32 has a base portion 311, 321 which interconnects the arms portions 314, 324 thereof. The base portion 311 of the first arm 31 has a first through hole 312 formed therein, a first bush member 49 fitted into the first through hole 312, a collar 90 received in the first bush member 49, and a rubber sealing ring 91 which engages one end of the first bush member 49 and which abuts against the base portion 311 of the first U-shaped member 31. The base portion 321 of the second U-shaped member 32 has a second through hole 322 of two different diameter formed therein so that a step portion with a plurality of engaging cavities 323 can be formed in the second through hole 322. The first and second through holes 312, 322 are aligned with one another in the transverse direction. A second bush member 49 is fitted in the central cavity 322 and is sleeved onto the second end 3022 of the tubular portion 302.

A plug member 58 is mounted in the second end 3022 of the tubular member 302. The plug member 58 has an axial blind hole 581 formed therein, a hexagonal hole 582 formed in a closed end thereof, and an external thread 583 which engages an internal thread formed in the second end 3022 of the tubular portion 302. Thus, the plug member 58 can be threaded into and out of the second end 3022 of the tubular portion 302 by engaging a hexagonal wrench and the hexagonal hole 582, and by rotating the plug member 58.

The pedal shaft 50 extends through the sealing ring 91 and the collar 90 in the first bush member 49, and is rotatable in the tubular portion 302, as described hereinbelow. The pedal shaft 50 has a first threaded end 51, which extends beyond the frame portion 301 and which is formed integrally with a radial ring 52, and a second threaded end 55. The second threaded end 55 of the pedal shaft 50 extends into the axial blind hole 581 of the cap member 58, a nut member 57 which engages the second threaded end 55, and a bearing 56 which is mounted near the second threaded end 55 of the pedal shaft 50. Therefore, the second threaded end 55 of the pedal shaft 50 can be supported rotatably in the second end 3022 of the tubular portion 302.

The tubular retaining member 60 has a closed end 601 and an open end 602. The closed end 601 of the retaining member 60 extends into the second end 3022 of the tubular portion 302 adjacent to the plug member 58 and has a first engaging hole 63 formed therein. The open end 602 of the retaining member 60 has two radial protrusions 61 extending diametrically and outwardly therefrom. The second end 3022 of the tubular portion 302 has two notches 3023 formed diametrically therein. The radial protrusions 61 of the retaining member 60 engage the notches 3023 of the tubular portion 302 so that the retaining member 60 is connected non-rotatably to the second end 3022 of the tubular portion 302.

The torsional spring member 70 has first and second ends 71, 72 and is disposed in the retaining member 60. The first end 71 of the torsional spring member 70 engages the first engaging hole 63 of the retaining member 60.

Figure 5:
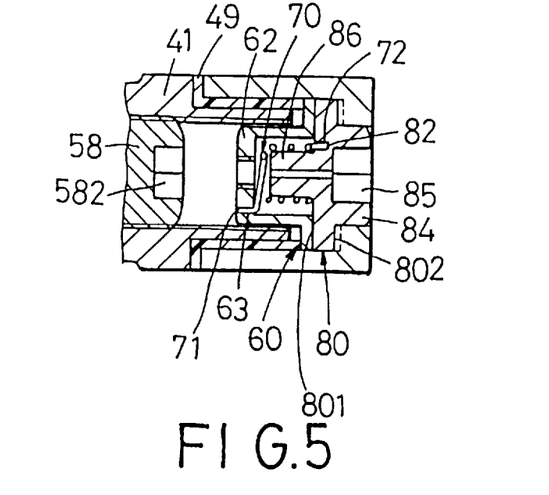
FIG. 5 is a cross sectional view of the preferred embodiment, taken along lines 5—5 in FIG. 4.
Figure 6:
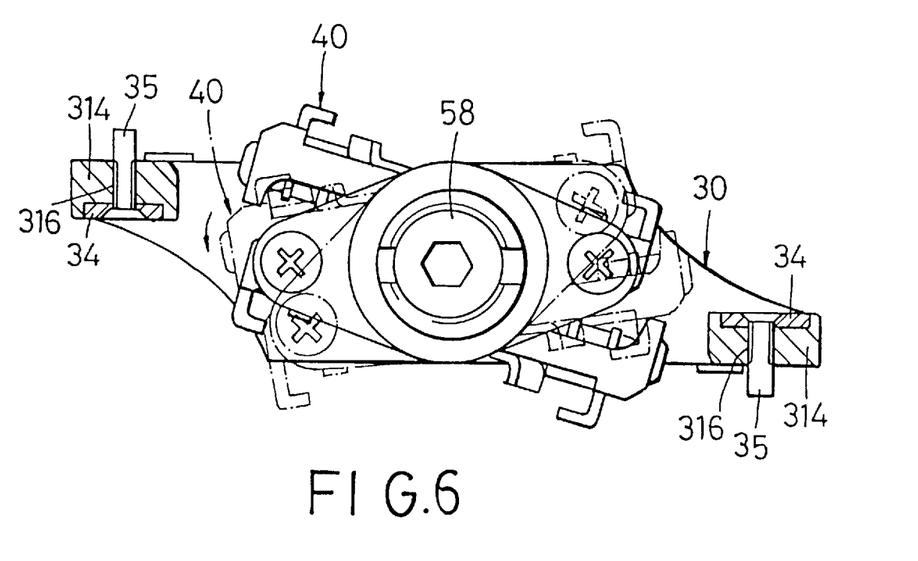
FIG. 6 is a schematic side view illustrating how a cleat engaging unit is rotated at an angle relative to a pedal body of the bicycle pedal assembly according to the present invention.

Referring to FIGS. 3 and 5, the disc member 80 is received in the second through hole 322 of the frame portion 301 and has opposite first and second side faces 801, 802. The first side face 801 of the disc member 80 has a second engaging hole 82 formed therein. The second side face 802 of the disc member 80 has a plurality of projections 83 formed thereon. The first and second side faces 801, 802 of the disc member 80 have axial projections 86, 84 extending respectively therefrom. The axial projection 84 is fitted in the second through hole 322 of the frame portion 301 and has a hexagonal hole 85 formed therein. The torsional spring member 70 is disposed around the axial projection 86, and biases the disc member 80 so that the projections 83 of the disc member 80 engage correspondingly the cavities 323 of the frame portion 301. The second end 72 of the torsional spring member 70 engages the second engaging hole 82 of the disc member 80 so that the cleat engaging unit 40 is positioned revertably at a predetermined angle with respect to the frame portion 301 of the pedal body 30, as best illustrated in FIG. 6. The cleat engaging unit 40 may be rotated upward and downward by an angle relative to a plane defined by the frame portion 301 of the pedal body 30 against the torsional force of the torsional spring member 70, as best illustrated in FIG. 6, thereby providing comfort to the user's feet during long distance riding.

It is noted that the torsional force of the torsional spring member 70 can be adjusted in order to suit the requirements of different users. For example, a smaller torsional force of the torsional spring member 70 is suitable for an unexperienced rider while a greater torsional force is suitable for an experienced rider. The adjustment is accomplished by engaging a hexagonal wrench and the hexagonal hole 85 of the disc member 80, pushing the disc member 80 toward the retaining member 60 against the biasing force of the torsional spring member 70 in order to disengage the projections 83 of the disc member 80 from the cavities 323 of the frame portion 301, rotating the disc member 80 by a predetermined angle, and releasing the disc member 80 in order engage the projections 83 and the cavities 323.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A bicycle pedal assembly comprising:
    a pedal body including a frame portion and a tubular portion with first and second ends which partitions said frame portion in a transverse direction, said frame portion having first and second through holes which are aligned with one another in the transverse direction, and a plurality of engaging cavities formed adjacent to said second through hole of said frame portion, said tubular portion having a cleat engaging unit fixed thereto, said second end of said tubular portion having a plug member with an axial blind hole engaging threadedly therein;

a pedal shaft extending rotatably through said tubular portion and having a first threaded end which extends through said first through hole of said frame portion, a second threaded end which extends into said axial blind hole of said plug member, a nut member which engages said second threaded end, and a bearing which is mounted near said second threaded end of said pedal shaft;

a tubular retaining member having a closed end and an open end, said closed end of said retaining member extending into said second end of said tubular portion adjacent to said plug member and having a first engaging hole formed therein, said open end of said retaining member being connected non-rotatably to said second end of said tubular portion;

a torsional spring member having first and second ends and being disposed in said retaining member, said first end of said torsional spring member engaging said first engaging hole of said retaining member; and a disc member received in said second through hole of said frame portion and having opposed first and second side faces, said first side face of said disc member having a second engaging hole formed therein, said second side face of said disc member having a plurality of projections formed thereon, said torsional spring member biasing said disc member so that said projections on said disc member engage correspondingly said cavities of said frame portion, said second end of said torsional spring member engaging said second engaging hole of said disc member so that said cleat engaging unit is positioned revertably at a predetermined angle with respect to said frame portion of said pedal body;

whereby, a torsional force of said torsional spring member can be adjusted by means of pushing said disc member toward said retaining member against the biasing force of said torsional spring member in order to disengage said projections of said disc member from said cavities of said frame portion, rotating said disc member, and releasing said disc member in order engage said projections and said cavities.

2. The bicycle pedal assembly as claimed in claim 1, wherein said frame portion is generally rectangular and has first and second U-shaped members and a pair of connecting plates, each of said first and second U-shaped members having two arm portions, said arm portions of said first and second U-shaped members being connected detachably to one another by said connecting plates.

3. The bicycle pedal assembly as claimed in claim 1, wherein said second end of said tubular portion has two notches formed diametrically therein, said open end of said retaining member having two radial protrusions extending diametrically and outwardly therefrom, said radial protrusions of said retaining member engaging said notches of said tubular portion.

4. The bicycle pedal assembly as claimed in claim 1, wherein said first side face of said disc member has an axial projection extending therefrom, said torsional spring member being disposed around said axial projection.

* * * * *

UNITED STATES PATENT AND TRADEMARK OFFICE
CERTIFICATE OF CORRECTION

PATENT NO. : 5,802,930
DATED : September 8, 1998
INVENTOR(S) : CHUNG-I CHEN

It is certified that error appears in the above-identified patent and that said Letters Patent is hereby corrected as shown below:

The Title Page should be deleted to appear as per attached Title Page.

Signed and Sealed this

Twenty-eighth Day of September, 1999

Attest:

Q. TODD DICKINSON

*Attesting Officer*     *Acting Commissioner of Patents and Trademarks*

United States Patent [19]

Chen

[11] Patent Number: 5,802,930
[45] Date of Patent: Sep. 8, 1998

[54] BICYCLE PEDAL ASSEMBLY HAVING A ROTATABLE CLEAT ENGAGING UNIT MOUNTED THEREON

[75] Inventor: Chung-I Chen, Taichung Hsien, Taiwan

[21] Appl. No.: 841,880

[22] Filed: May 5, 1997

Related U.S. Application Data

[63] Continuation-in-part of Ser. No. 837,243, Apr. 10, 1997.

[51] Int. Cl.⁶ .............................. B62M 3/08; G05G 1/14
[52] U.S. Cl. ................................... 74/594.6; 74/594.4
[58] Field of Search ....................... 74/594.4, 594.6, 74/560; 36/131, 132, 134

[56] References Cited

U.S. PATENT DOCUMENTS

| | | | |
|---|---|---|---|
| 5,203,229 | 4/1993 | Chen | 74/594.6 |
| 5,259,270 | 11/1993 | Lin | 74/594.6 |
| 5,419,218 | 5/1995 | Romano | 74/594.6 |
| 5,685,202 | 11/1997 | Chen | 74/594.4 X |
| 5,692,415 | 12/1997 | Lin | 74/594.6 |
| 5,697,262 | 12/1997 | Chen | 74/594.6 |

FOREIGN PATENT DOCUMENTS

| | | | |
|---|---|---|---|
| 0 619 219 A1 | 10/1994 | European Pat. Off. | 74/594.6 |
| 0 753 454 A1 | 1/1997 | European Pat. Off. | 74/594.6 |

*Primary Examiner*— Ving T. Luong
*Attorney, Agent, or Firm*— Panitch, Schwarze, Jacobs & Nadel, P.C.

[57] ABSTRACT

A bicycle pedal assembly includes a pedal body, a pedal shaft, a retaining member, a disc member, a torsional spring member and a pedal shaft. The pedal body has a frame portion and a tubular portion which partitions the frame portion. A cleat engaging unit is connected to the tubular portion. The retaining member is connected non-rotatably to an end of the tubular portion. The disc member has a plurality of projections which engage correspondingly a plurality of cavities that are formed in the frame portion. The torsional spring member interconnects the retaining member and the disc member in order to position revertably the cleat engaging unit at a predetermined angle with respect to the frame portion. The torsional force of the torsional spring member can be adjusted by disengaging the projections on the disc member from the cavities of the frame portion, rotating the disc member by an angle, and engaging the projections and the cavities.

4 Claims, 5 Drawing Sheets